Oct. 16, 1928.  R. S. BLAIR  1,688,032
WAVE MOTOR
Filed March 29, 1922   2 Sheets-Sheet 1
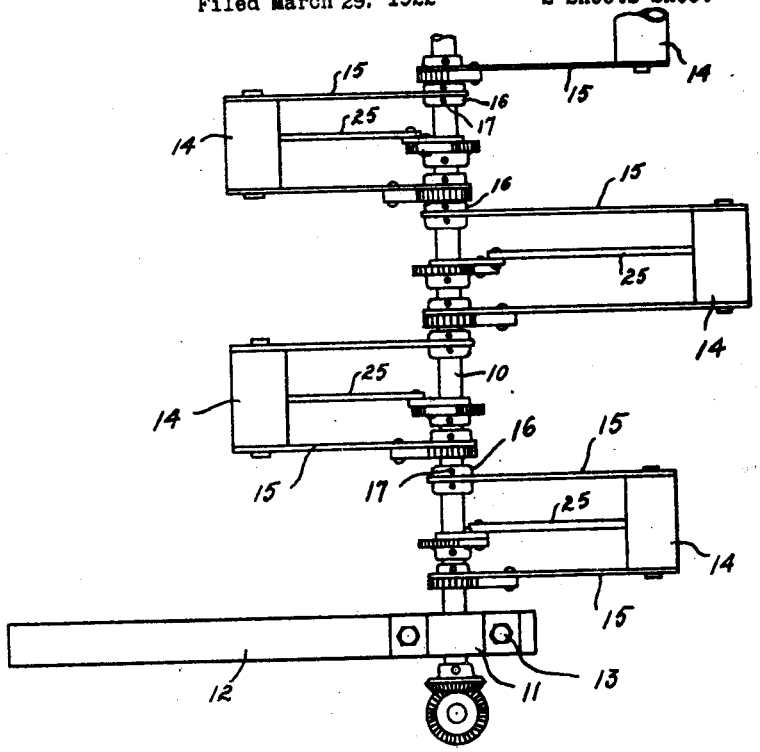
Fig. II
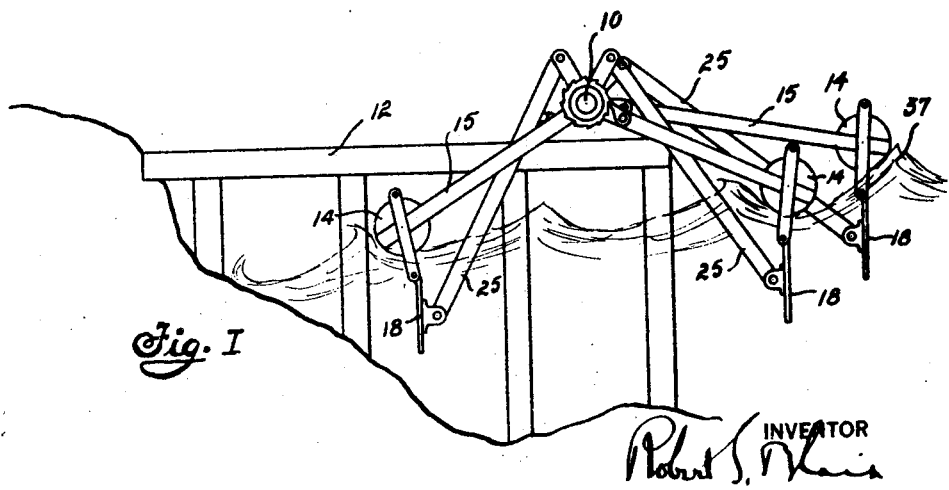
Fig. I
INVENTOR
Robert S. Blair Oct. 16, 1928.
R. S. BLAIR
1,688,032
WAVE MOTOR
Filed March 29, 1922　　2 Sheets-Sheet 2
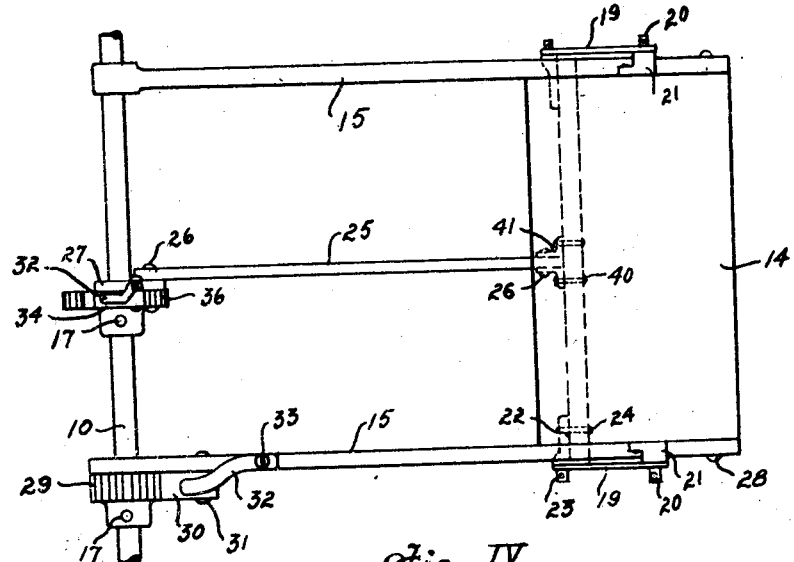
Fig. IV
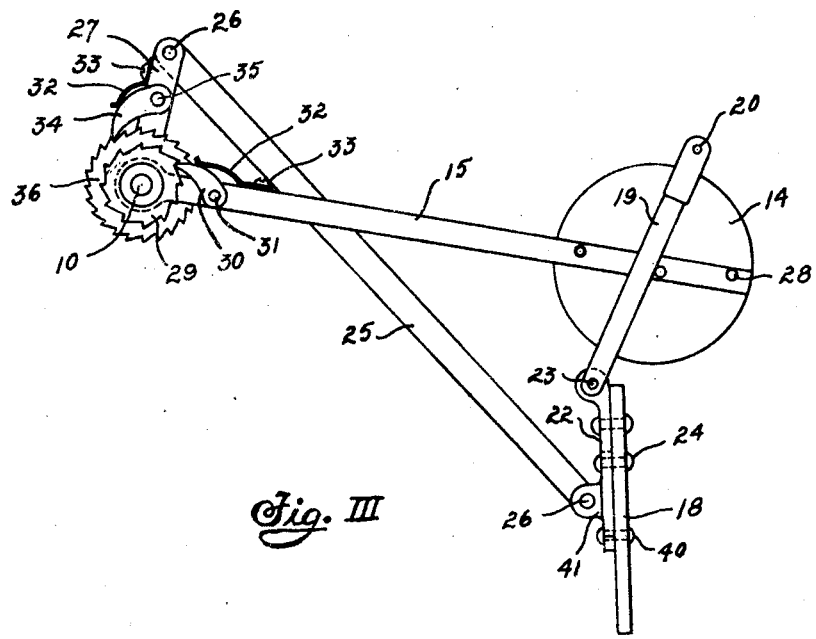
Fig. III
INVENTOR

Patented Oct. 16, 1928.

1,688,032

UNITED STATES PATENT OFFICE.

ROBERT S. BLAIR, OF STAMFORD, CONNECTICUT.

WAVE MOTOR.

Application filed March 29, 1922. Serial No. 547,869

This invention relates to wave motors and, with regard to certain features, more particularly to apparatus of such character as is adapted to convert the energy contained in the waves of the ocean into a more useful form.

One of the objects thereof is to provide a wave motor of simple and practical construction, reliable in action. Another object is to provide a wave motor which is simple to install on the shore of the ocean and which requires no expense of dams or seawalls. Another object is to provide a wave motor which may be installed on existing wharves with but slight expense for alteration. Another object is to provide a wave motor which will be equally effective for various heights of tide. Another object is to provide a wave motor which will be actuated by the up and down movement of the waves and the undertow, the so-called return movement of the water after the wave crest has moved forward. Other objects will be in part obvious and in part pointed out hereinafter.

The invention accordingly consists in the features of construction, combinations of elements and arrangements of parts which will be exemplified in the structure hereinafter described and the scope of the application of which will be indicated in the following claims.

In the accompanying drawings in which is shown one of the various possible embodiments of this invention, Figure I is a side elevation of the wave motor mounted upon the wharf. Figure II is a plan view of the wave motor shown in Figure I mounted on the end of the wharf. Figure III is an end elevation in enlarged detail of the wave motor shown in Figure I, showing one of the floats and the linkage connecting it to the power shaft. Figure IV is a plan view of the float and connecting linkage shown in Figure III.

Similar reference characters refer to similar parts throughout in the various views of the drawings.

Turning now to Figures I and II, we have a power shaft 10 journaled in bearings such as 11 which are fastened to the end of the wharf 12 by bolts such as 13. A plurality of floats such as 14 are riveted to the ends of a plurality of pairs of arms such as 15; the other end of the arms 15 are swiveled on the power shaft 10 and are restrained from relative axial movement along the power shaft 10 by means of suitable thrust collars such as 16 which are fixed thereon by means of set screws such as 17. As shown in Figure II the wave motor consists of five floats 14 only, there being three floats 14 arranged to the right hand of the power shaft 10 and two floats 14 to the left hand thereof. The three right hand floats 14 are arranged so that when a wave of average length is passing thereunder two of the floats 14 will be at the extremes of the motion which would be imparted thereto by the wave while the third float 14 would be at an intermediate position approximately half way between the two extremes. The arms 15 connecting the left hand floats 14 to the power shaft 10 are so arranged with regard to the distance from the center of the floats 14 to the center of the power shaft 10 that in combination with the floats 14 to the right of the power shaft 10 they will exert a nearly uniform turning movement on the power shaft 10 resulting in an approximately uniform rotation thereof.

Turning now to Figures III and IV which show in enlarged detail one of the floats 14 and the linkage connecting it to the power shaft 10, we have a paddle 18 suspended below the float 14 by means of a supporting link 19, the upper end of which link is swiveled on a pin 20 which is secured in the lug 21 riveted on the ends of the float 14 at the upper edge; the lower ends of the supporting links 19 are connected to a lug 22 by means of a pin 23, the lug 22 being riveted to the paddle 18 by rivets such as 24. A link 25 has its right hand end connected to the lug 41 by means of a pin 26, lug 41 being riveted to the center of paddle 18 by rivets as 40, the other end of link 25, being connected to the lever 27 by means of a similar pin 26. The lever 27 at the other end is journaled on the power shaft 10 as is more clearly shown in Figure IV. The floats 14 are rigidly connected to the arms 15 by being riveted thereto by rivets such as 28, there being two arms 15 connecting each float 14 to the power shaft 10 while the appended paddle 18 is connected to the power shaft 10 by one link such as 25 swiveled to its center. The ratchet 29 fastened on the power shaft 10 by a set screw such as 17 has engaging thereto a pawl 30 which is swiveled about a stud 31 threaded into the arm 15; the leaf spring 32 fastened at one end of the arm 15 by means of a screw 33 has its other end bearing on the pawl 30 and holds it at all times in engagement with the ratchet 29. In the drawing one pawl only is shown for transferring motion from the float 14 to the power shaft 10 but in case it is desired to obtain the effect of a ratchet of double the number of teeth it may be obtained by mounting another pawl on the other arm 15 which is connected to the float 14 and a ratchet on the power shaft 10 to engage therewith. A similar pawl 34 is swiveled about the stud 35 threaded into the lever 27 and engages with a ratchet 36 fastened to the power shaft 10 by means of a set screw such as 17; a similar leaf spring 32 fastened at one end to the lever 27 by means of a screw 33 has its other bearing on the pawl 34 and holding it at all times in engagement with the ratchet 36. The ratchets 29 and 36 are arranged with their teeth sloping in the same direction so that the impulses imparted thereto by the pawls 30 and 34 will cause rotation of the power shaft 10 in the same direction at all times. The arms 15 connecting the float 14 with the power shaft 10 are arranged in pairs for each float 14 and it is to be understood that whenever they are mentioned in this specification each is similarly arranged and acts in a similar manner.

The action of the apparatus above described is substantially as follows: Having a wave motor of the design above described mounted on the end of a wharf 12 which is so situated on the shore of the ocean that for all heights of tide there will be ready access of unrestricted waves to the floats 14. A wave 37 advancing to the shore in passing under the float 14 which is mounted on the longest arms 15 lifts the float 14 upward, as the load on the power shaft 10 is so proportioned that the torque reaction therefrom on the float 14 will be less than the buoyancy of the float 14 and consequently it will readily rise as the wave 37 passes under it. Turning now to Figure III it will be seen that as the float 14 rises it will cause the arm 15 to swing in a counter-clockwise direction around the power shaft 10 as it is fastened to the end of the arm 15 by means of rivets such as 28. The counter-clockwise rotation of the arm 15 around the power shaft 10 as an axis will bring the pawl 30 up against one of the teeth of the ratchet 29 and will then set the power shaft 10 into counter-clockwise rotation along with the arm 15 as the pawl 30 is rigidly connected to the arm 15 by the stud 31. After a wave has passed under the float 15 to such an extent that its crest has passed beyond, the float 14 will begin to drop following the contour of the rear surface of the wave. As the float 14 drops the arm 15 is caused to swing in a clockwise direction about the power shaft 10 under its action and the pawl 30 will be drawn away from engagement with the teeth of the ratchet 29 in a manner which is common in the operation of all ratchets and pawls. The leaf spring 32 which is fastened to the arm 15 by the screw 33 will at all times keep the pawl 30 pressed against the teeth of the ratchet 29 so that whenever the motion of the arm 15 may be changed to rotation in a counter-clockwise direction about the power shaft 10 the pawl 30 will be ready at once to engage with the teeth on the ratchet 29 and impart the motion of the arm 15 to the ratchet 29 and the power shaft 10 upon which it is secured by the set screw 17, once more. From the above it will be seen that the up and down movement of the float 14 when acted upon by a wave passing under it will cause an intermittent movement of the power shaft 10 in a counter-clockwise direction.

The backward flow of the water below the surface which occurs after a wave has passed any given point is made use of by the paddle 18 which is arranged in an approximately perpendicular position against this flow which we may call the undertow. Under the action of the undertow of the same wave which caused the float 14 to rise and fall the paddle 18 is forced over to the right carrying with it the end of the link 25 which is swiveled on the pin 26 in the lug 41 which is riveted to the paddle 18 by the rivets 40; the motion thus imparted to the link 25 is transmitted by the other end thereof where it is connected to the lever 27 by means of the pin 26 and causes a clockwise rotation of the lever 27 about the power shaft 10 as an axis of rotation. The clock-wise rotation of the lever 27 carries with it the pawl 34 and as the ratchet 36 which is arranged to engage with the pawl 34 is designed to take motion in a counter-clockwise direction from the lever 27 it will be seen that the pawl 34 will click over the teeth of the ratchet 36 being held down thereagainst by the leaf spring 32 which is fastened to the lever 27 by a screw 33. Thus the pawl 34 is prepared at any moment when the rotation of the lever 27 about the power shaft 10 may change to motion in a counter-clockwise direction, to impart movement to the ratchet 36 in the same manner that the motion was transmitted from the arm 15 to the ratchet 29 as above described. The force of the undertow having been expended in moving the paddle 18 to the right with reference to the float 14 the supporting link 19, connecting the upper end of the lug 22 to the lug 21 on the float 14, swinging to the right about the pin 20 in the meanwhile is now prepared to return towards the left as the flow of water against the paddle 18 reverses due to the approach of another wave which, impinging against the right hand surface of the paddle 18, will drive it over towards the left thus causing the link 25 to move over towards the left and cause a counter-clockwise rotation of the lever 27 about the power shaft 10 as an axis in the manner just the reverse of that above described. The pawl 34 now engages firmly with a tooth of the ratchet 36 and imparts the counter-clockwise rotation of the lever 27 to the ratchet 36 and the power shaft 10 to which it is rigidly fastened by the set screw 17.

The summation of the various impulses in a counter-clockwise direction imparted to the power shaft 10 by the pawls 30 and 34 acting on the ratchets 29 and 36 will cause an approximately uniform rotation of the power shaft 10 in a counter-clockwise direction, and when the impulses from the other floats 14 which are also connected to the power shaft 10 are added to those which have been just mentioned it will be seen that we will have a quite uniform rotation of the power shaft 10. The velocity of rotation of the power shaft 10 will be quite uniform for various heights of waves passing under the floats 14. As is well known, the higher the waves of the ocean are as in the case of a high wind or storm, the greater the distance between their crests so that the up and down movement which they impart to any object floating on the surface of the ocean would be nearly the same under all conditions.

As the surface of the waves falls at the approach of low tide the floats 14 will fall correspondingly, the linkage connecting them and the paddle 18 to the the power shaft 10 permitting them to do so; the only change which will be caused by the dropping of the surface of the ocean will be a slight change in the angularity of the arms 15 and the links 25 which would have very little or no influence on the operation of the wave motor as above described. An increase in the height of the ocean's surface will cause a change in the angularity of the arms 15 and the links 25 in a manner just the opposite of that above described and will have a corresponding slight effect upon the operation of the wave motor. It is to be understood that the correct operation of the wave motor depends upon the operator not attempting to draw too much power from the power shaft 10 by means of a pulley and belt, which may be mounted at any convenient place on the power shaft 10, as an attempt in such a direction will result in the floats 14 being submerged in the water as the waves pass under them instead of their floating as the proper operation of the wave motor requires.

It will be understood that at a given point in a body of water at the moment of a wave's passing, there is an up and down movement of the surface, which movement may be termed the vertical component of the wave; also that at the same time there is a forward and backward movement of water, the latter of which is called the undertow, substantially along the direction of its surface and this movement may be termed the lateral component of the wave. The paddles 18 suspended in the path of the waves serve to tend to increase the vertical components and the floats 14 riding upon the surface of the waves tend to flatten the same and to increase their lateral components.

The hinged paddles 18 offer a resistance to the lateral movement of the waves and thereby tend to force the water upwardly and to increase the vertical components of the wave. The parts 18 thus aid in lifting the floats 14. At the same time the float 14 opposes the vertical component of the waves and the upward movement of the water so as to increase the lateral component above what it would be without the float, and brings about an increase of lateral thrust against the members 18.

From the above it will be seen that there has been provided a wave motor of such a type that it may be readily attached to any existing wharf and which may be made of durable materials and which will require no shelter or protection from inclement weather.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim as my invention:

1. In apparatus for the generation of power from water waves, in combination, a float resting upon the water, a member carried by said float and movable relative thereto and adapted to be moved relative to said float by the lateral component of the waves, a member adapted to be driven to serve as a source of power, and a connection between said driven member and said member carried by said float adapted to drive the former from said movements of the latter.

2. In apparatus for the generation of power from water waves, in combination, a float resting upon the water, a member pivotally suspended from said float and adapted to be moved about its pivot by the effect of the lateral components of the waves, a member adapted to be driven to serve as a source of power, and a connection between said pivoted member and said driven member adapted to drive the latter from the former.

3. In apparatus for the generation of power from water waves, in combination, a float resting upon the water, a member carried by said float and movable relative thereto, said member exposing a substantially upright flat surface adapted to utilize the lateral components of the waves to move said member relative to said float, a member adapted to be driven to serve as a source of power, and a connection between said driven member and said first member adapted to drive the former from said movements of the latter, said connection and the mounting of said member upon said float being adapted to maintain said surface of said member substantially upright regardless of the movements thereof.

4. In apparatus for the generation of power from water waves, in combination, a float resting upon the water to rise and fall with the waves, a member carried by said float adapted to be moved by the lateral components of the waves, a member adapted to be driven to serve as a source of power, a connection adapted to drive said member from the movements of said float, and a connection adapted to drive said member from the movements of said member carried by said float.

5. In apparatus for the generation of power from water waves, in combination, a float resting upon the water adapted to rise and fall with the waves, a member carried by said float and extending beneath the surface of the water and exposing a substantially flat and substantially upright surface adapted to utilize the lateral components of the waves to move said member laterally, a rotatable shaft adapted to be driven, a connection between said shaft and said float, and a connection between said shaft and said member adapted to utilize both the rise and fall of said float and the lateral movements of said member to drive said shaft.

6. In apparatus for the generation of power from water waves, in combination, a float resting upon the water and adapted to rise and fall with the waves and formed and mounted to permit the water to pass freely thereunder, the apparatus being free from obstruction to such passage of the water, a member adapted to be driven to serve as a source of power, a connection between said float and said member adapted to drive the latter from the movements of the former, said float having a substantially vertical member depending from the lower surface thereof adapted to offer resistance to the lateral movement of the waves, tending to force the water upwardly, said vertical member being so positioned with respect to said float that said forcing of water upwardly thereby tends to raise said float bodily.

7. In apparatus for the generation of power from water waves, in combination, a float adapted to rest in the water, a member mounted lower than said float in the water and exposing a surface to utilize the lateral component of the waves, a driven member adapted to serve as a source of power, and means connecting said float and said lower member with said last member to utilize the movement of both said float and said lower member to drive the same.

8. In apparatus for the generation of power from water waves, in combination, a rotatable shaft adapted to be driven to serve as a source of power mounted above the water and positioned with its axis substantially transverse to the direction of movement of the waves, a plurality of devices positioned in the water on both sides of said shaft and adapted to be moved by the waves, each of said devices including a part adapted to be given a vertical movement by the waves and a part adapted to be given a lateral movement by the waves, and means adapted to utilize the movements of both of said parts of each of said devices to drive said shaft.

9. In apparatus for the generation of power from water waves, in combination, a float resting upon the water, means carried by said float adapted to be moved relative to said float by the action of the waves, said float serving to maintain said means at the proper position for coaction with the waves regardless of the height of the water, a member mounted independently of said float adapted to be driven to serve as a source of power, and a connection between said member and said means carried by said float adapted to drive said member from said movements of said means.

10. In apparatus for the generation of power from water waves, in combination, a float having a substantially cylindrically shaped bottom portion resting in the water and adapted to be moved by the waves, a plate member extending downwardly from said bottom surface of said float and presenting a substantially upright face in the path of movement of the waves, said member being adapted to offer resistance to the lateral movement of the waves and tending to force the water upwardly toward said cylindrical float-bottom, and means adapted to utilize the bodily up and down movements of said float to drive a shaft.

11. In apparatus for the generation of power from water waves, in combination, a float resting upon the water adapted to be given an up and down movement by the waves, a member resting in the water and adapted to be given a lateral movement by the waves, means adapted to be driven to serve as a source of power, means adapted to utilize said up and down movement of said float to drive said first means, and means adapted to utilize said lateral movement of said member to drive said first means, said float and said member being so arranged that one tends in its action to increase the wave action utilized by the other.

12. In apparatus for the generation of power from water waves, in combination, a float resting upon the water, and a plate member supported from said float and depending therefrom into the water thereBeneath and adapted to be moved relative to said float by the lateral components of the waves, a member adapted to be driven to serve as a source of power, and means connecting said last member and said plate to drive the latter from said movements of the former.

13. In apparatus for the generation of power from water waves, in combination, a float resting in the water and adapted to be given an up and down movement by the waves, and a substantially upright plate member secured to said float and depending therefrom into the water, said plate member offering resistance to the lateral movement of the waves and tending to force the water upwardly, said plate member being positioned at a rear portion of said float with respect to the direction of movement of the waves so that said forcing of the water upwardly tends to raise said float bodily, a member adapted to be driven to serve as a source of power, and means adapted to utilize said up and down movements of said float to drive said member.

14. In apparatus for the generation of power from water waves, in combination, a shaft, a plurality of arms mounted to swing about said shaft as an axis and projecting outwardly from said shaft substantially at right angles thereto, a float secured to the outer ends of said arms resting in the water and adapted to be moved by the waves, means adapted to rotate said shaft from the swinging movement of said arms imparted thereto by said movements of said float, and means carried by said float adapted to be moved relatively to said float by the action of the waves, and means adapted to rotate said shaft from said movement of said last means.

15. In apparatus for the generation of power from water waves, in combination, a member adapted to be driven, a device positioned in the water having means adapted to be given a vertical movement by the vertical components of the waves and having means adapted to be given a lateral movement by the lateral components of the waves, and means for transmitting the said movements of said two means to drive said member.

16. In apparatus for the generation of power from waves, in combination, a member adapted to be driven, a device positioned in the water having means adapted to be given a vertical movement by the vertical components of the waves and means adapted to be given a lateral movement by the lateral components of the waves, said two means being so related that each tends to increase the wave component utilized by the other, and means for transmitting the said movements of said two means to drive said member.

17. In apparatus for the generation of power from water waves, in combination, a shaft extending substantially parallel to the shore, a plurality of devices mounted on each side of said shaft and adapted to be moved by the action of waves traveling toward the shore, said devices being out of alinement one with the other in a direction transverse to the shaft, and means connecting said devices with said shaft and adapted to drive said shaft by the action of waves thereon.

18. In apparatus for the generation of power from water waves, in combination, a member adapted to be driven, a device positioned in the water adjacent said member and adapted to be given a vertical movement by the vertical components of waves engaging the same, a device positioned in the water adjacent said member and independently movable with respect to said first device and adapted to be moved by the lateral components of waves engaging the same, and means for transmitting the said movements of the said two devices to drive said member.

19. In apparatus for the generation of power from water waves, in combination, a member adapted to be driven, a device positioned in the water adjacent said member and adapted to be given a vertical movement by the vertical components of waves engaging the same, a device positioned in the water adjacent said member and independently movable with respect to said first device and adapted to be moved by the lateral components of waves engaging the same, and independent means adapted to transmit independently the movements of said two devices to said member to drive the same.

20. In apparatus for the generation of power from water waves, in combination, a substantially upright member, means mounting said member in position to meet an unobstructed wave, a float positioned higher than said first member and in advance thereof in the direction from which the wave proceeds, whereby the vertical component of the waves beneath said float is increased, and means adapted to translate the vertical bodily movements of said float into mechanical power.

21. In apparatus for the generation of power from water waves, in combination, a shaft adapted to be driven to serve as a source of power, a plurality of swinging arms extending upwardly from said shaft, means mounted adjacent the outer ends of said arms adapted to utilize the vertical component of waves, independently movable means adapted to utilize the horizontal components of waves, and power-transmitting means from each of said utilizing means to said shaft to drive the same.

In testimony whereof, I have signed my name to this specification this 28th day of March, 1922.

ROBERT S. BLAIR.